US011190640B2

(12) United States Patent
Singer et al.

(10) Patent No.: US 11,190,640 B2
(45) Date of Patent: Nov. 30, 2021

(54) COMBINATION OF REAL-TIME ANALYTICS AND AUTOMATION

(71) Applicant: Verint Americas Inc., Alpharetta, GA (US)

(72) Inventors: David Warren Singer, Indianapolis, IN (US); Daniel Thomas Spohrer, Alpharetta, GA (US); Marc Adam Calahan, Milton, GA (US); Paul Michael Munro, Scotland (GB); Gary Andrew Duke, Fleet (GB); Padraig Carberry, Lifford (IE); Christopher Jerome Schnurr, Culmore (IE)

(73) Assignee: VERINT AMERICAS INC., Alpharetta, GA (US)

( * ) Notice: Subject to any disclaimer, the term of this patent is extended or adjusted under 35 U.S.C. 154(b) by 29 days.

(21) Appl. No.: 16/407,891

(22) Filed: May 9, 2019

(65) Prior Publication Data
US 2020/0358898 A1    Nov. 12, 2020

(51) Int. Cl.
*H04M 3/51* (2006.01)
*G06Q 20/40* (2012.01)
*G10L 17/00* (2013.01)
*G10L 17/06* (2013.01)

(52) U.S. Cl.
CPC ...... *H04M 3/5175* (2013.01); *G06Q 20/4016* (2013.01); *G10L 17/00* (2013.01); *G10L 17/06* (2013.01)

(58) Field of Classification Search
None
See application file for complete search history.

(56) References Cited

U.S. PATENT DOCUMENTS

| 9,106,757 | B2 * | 8/2015 | Kim | H04M 1/72519 |
|---|---|---|---|---|
| 9,160,853 | B1 * | 10/2015 | Daddi | H04M 3/2281 |
| 9,225,833 | B1 * | 12/2015 | Koster | H04M 3/42221 |
| 9,413,891 | B2 * | 8/2016 | Dwyer | G10L 15/30 |
| 9,871,918 | B1 * | 1/2018 | Hernandez | G10L 25/63 |
| 2004/0249650 | A1 * | 12/2004 | Freedman | G06Q 30/02 705/7.29 |
| 2009/0210228 | A1 | 8/2009 | George | |
| 2011/0010173 | A1 | 1/2011 | Scott et al. | |
| 2014/0140497 | A1 * | 5/2014 | Ripa | H04M 3/5133 379/265.06 |
| 2014/0164312 | A1 * | 6/2014 | Lynch | H04M 3/493 706/50 |
| 2014/0164508 | A1 * | 6/2014 | Lynch | H04L 67/00 709/204 |

(Continued)

OTHER PUBLICATIONS

International Search Report and Written Opinion, dated Jul. 16, 2020, received in connection with International Patent Application No. PCT/US2020/030647.

*Primary Examiner* — Quoc D Tran
(74) *Attorney, Agent, or Firm* — Meunier Carlin & Curfman LLC (57) ABSTRACT

Real-time speech analytics (RTSA) provides maintaining real-time speech conditions, rules, and triggers, and real-time actions and alerts to take. A call between a user and an agent is received at an agent computing device. The call is monitored to detect in the call one of the real-time speech conditions, rules, and triggers. Based on the detection, at least one real-time action and/or alert is initiated.

17 Claims, 5 Drawing Sheets

(56) References Cited

U.S. PATENT DOCUMENTS

| | | | |
|---|---|---|---|
| 2014/0359739 A1* | 12/2014 | Bao | G06F 21/46 |
| | | | 726/7 |
| 2015/0281445 A1 | 10/2015 | Kumar et al. | |
| 2016/0142534 A1 | 5/2016 | Guerra et al. | |
| 2017/0026514 A1 | 1/2017 | Dwyer et al. | |
| 2017/0148073 A1* | 5/2017 | Nomula | G06Q 30/0629 |
| 2018/0190296 A1 | 7/2018 | Williams et al. | |
| 2020/0110732 A1* | 4/2020 | Beaver | G06F 16/215 |

* cited by examiner

COMBINATION OF REAL-TIME ANALYTICS AND AUTOMATION

BACKGROUND

Speech analytics is the process of analyzing recorded calls to gather customer information. Speech analytics can provide analysis of recorded phone conversations between a company and its customers.

Real-time speech analytics listen to voice interactions as they happen. Real-time speech analytics can analyze the words spoken on a call in real-time. Conventional real-time speech analytics are basic and simple. Moreover, conventional analytical or automation systems operate either in silos or require heavy, expensive, and complex custom integration to work together.

SUMMARY

Real-time speech analytics (RTSA) systems and methods maintain real-time speech conditions, rules, and triggers, and real-time actions and alerts to take. A call between a user and an agent is received at an agent computing device. The call is monitored to detect in the call one of the real-time speech conditions, rules, and triggers. Based on the detection, at least one real-time action and/or alert is initiated. The systems and methods provided herein allow for rapid integration and rules configuration across systems without requiring custom code. These include real-time biometric analytics, real-time speech analytics, real-time desktop/activity analytics, and desktop pop-ups/real-time guidance/invocation of desktop commands or web-services for automated action.

Elements of the analytics and automation solution are provided as well as the ability to tie them together in user configurable ways to solve varied and evolving business problems.

An embodiment that is described herein provides a real-time speech analytics (RTSA) system that comprises a rules module configured to maintain a plurality of rules pertaining to a call; a detection module configured to listen to the call according to the plurality of rules and to detect that one of the plurality of rules is triggered as a match or as an event; an analysis module configured to analyze the match or the event and determine at least one of an action or an alert to perform; and an action and alerts module configured to receive an instruction from the analysis module pertaining to the at least one of the action or the alert to perform, and configured to perform the at least one of the action or the alert.

In another embodiment, a system is provided that comprises an agent computing device configured to receive a call from a user computing device; and a computing device comprising a real-time speech analytics (RTSA) engine configured to monitor and analyze the call in real-time to detect at least one of predetermined words, predetermined phrases, and sentiment, and to guide an interaction during the call using one or more automated interventions.

In another embodiment, a method comprises maintaining, at a detection module, a plurality of real-time speech conditions, rules, and triggers; maintaining, at an analysis module, a plurality of real-time actions and alerts to take; receiving a call at an agent computing device; detecting in the call one of the plurality of real-time speech conditions, rules, and triggers; and initiating one or more of the plurality of real-time actions and alerts based on the detected one of the plurality of real-time speech conditions, rules, and triggers.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
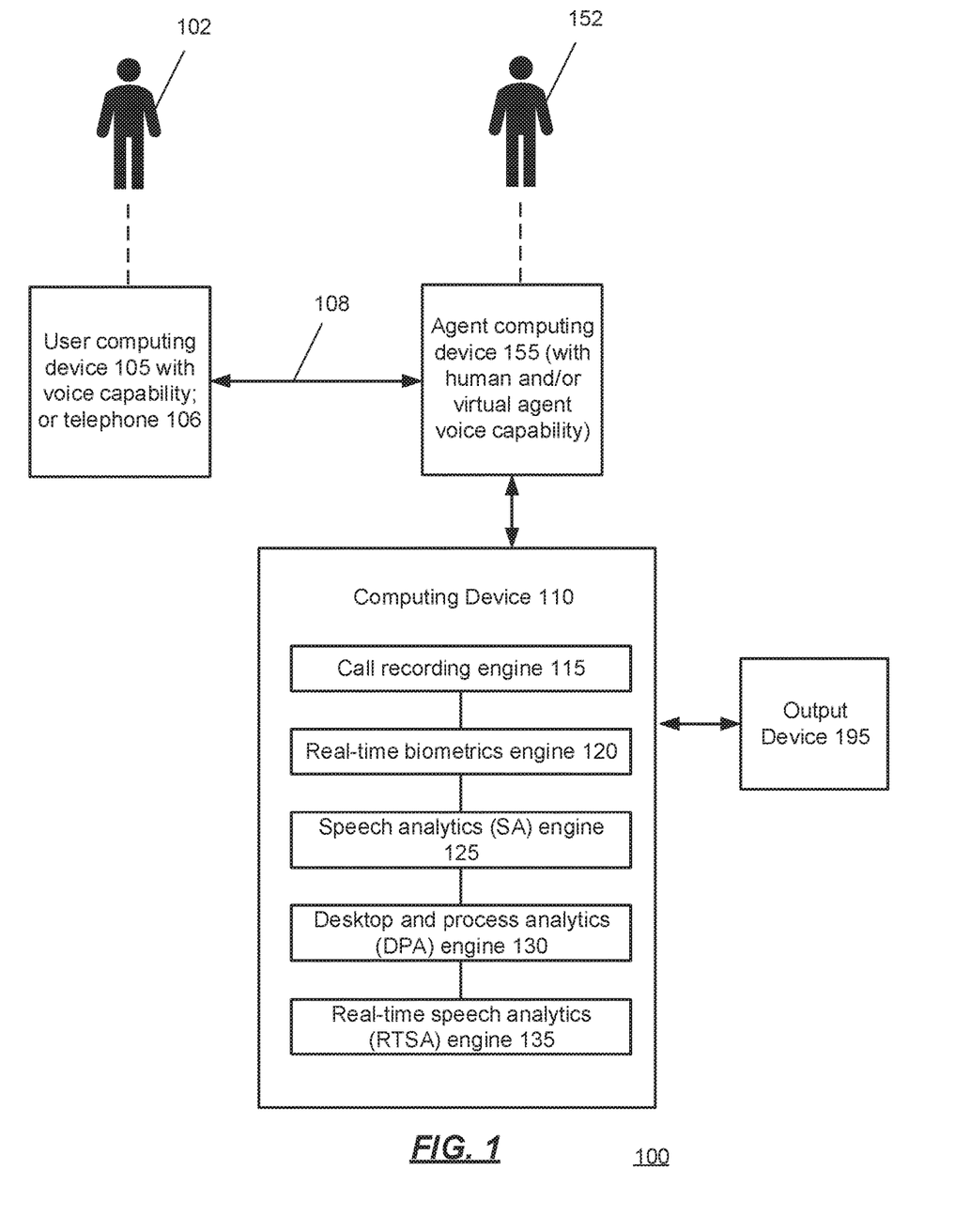
FIG. 1 is an illustration of an exemplary environment for real-time speech analytics.

FIG. 1 is an illustration of an exemplary environment 100 for real-time speech analytics. A user 102, using a user computing device 105 with voice capability or using a telephone 106 contacts an entity through a network 108. More particularly, the user 102 contacts an agent 152 (or representative, employee, associate, etc.) of a company using the user computing device 105 or the telephone 106 in communication with an agent computing device 155 via the network 108. The agent computing device 155 has human voice capability. Additionally or alternatively, the agent computing device 155 has virtual agent voice capability.

A computing device 110 may be in communication with the agent computing device 155 to monitor the speech in a voice call (i.e., the conversation) between the user computing device 105 (or the telephone 106) and the agent computing device 155. The computing device 110 may be implemented in, or embodied in, a desktop analytics product or in a speech analytics product, in some implementations. Depending on the implementation, an output device 195 may be in communication with the computing device 110, in either a wired connection or a wireless connection.

The network 108 may be a variety of network types including the public switched telephone network (PSTN), a cellular telephone network, and a packet switched network (e.g., the Internet). Although only one user computing device 105/telephone 106, one agent computing device 155, one computing device 110, and one output device 195 are shown in FIG. 1, there is no limit to the number of computing devices 105, 155, 110, telephones 106, and output devices 195 that may be supported.

Figure 5:
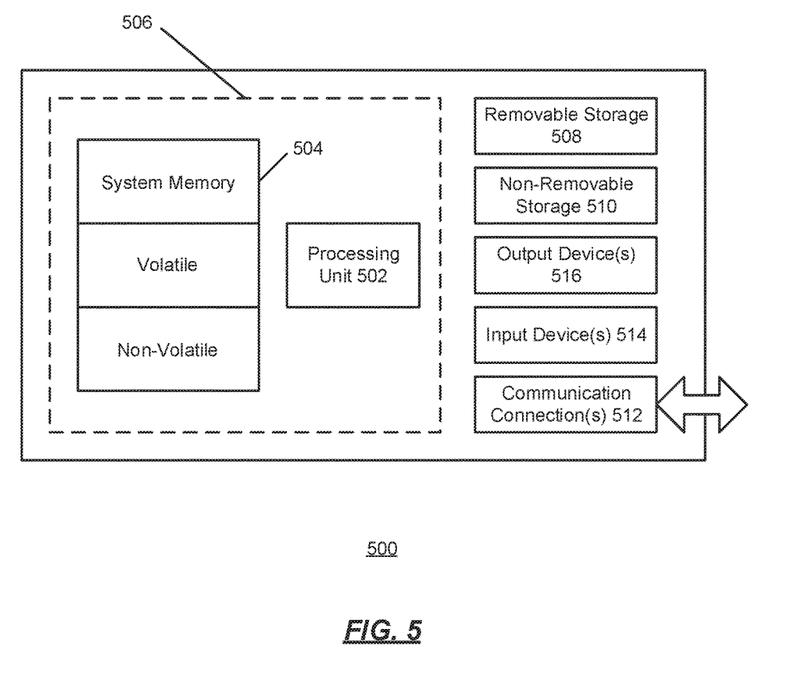
FIG. 5 shows an exemplary computing environment in which example embodiments and aspects may be implemented.

The user computing device 105, the agent computing device 155, the computing device 110, and the output device 195 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 5 as the computing device 500.

In some implementations, the computing device 110 comprises a call recording engine 115, a real-time biometrics engine 120, a speech analytics (SA) engine 125, a desktop and process analytics (DPA) engine 130, and a real-time speech analytics (RTSA) engine 135. As described further herein, the computing device 110 and its various engines 115, 120, 125, 130, and 135 assist the agent 152 in providing better service and information to the user 102. The computing device 110 recognizes conditions based on the conversation between the user 102 and the agent 152 in different ways and contexts. More complex rules and actions may be implemented based on what the user 102 and/or the agent 152 is saying and doing (e.g., actions they are taking) and based on the history of the phone call and conversation between the user 102 and the agent 152.

The call recording engine 115 captures the interaction between the user computing device 105 (or the telephone 106) and the agent computing device 155. Additionally, the call recording engine 115 may capture computer telephony integration (CTI) events, and also be used to set rules for analysis.

The real-time biometrics engine 120 authenticates the user 102, e.g., by analyzing the speech of the user 102 as received from the user computing device 105 (or the telephone 106). The authentication is performed in real-time when the user 102 calls the agent computing device 155. Any type of voice or speech biometrics authentication may be used.

The SA engine 125 analyzes and automatically categorizes calls. The SA engine 125 also publishes categories to RTSA rules. The SA engine 125 provides phonetic recognition and full transcription of calls, utilizing advanced language understanding.

The DPA engine 130 incorporates desktop events at the agent computing device 155 for broader and richer interaction context between the user 102 and the agent 152 (e.g., between the user computing device 105 and the agent computing device 155). The DPA engine 130 may drive notification and automation.

The RTSA engine 135 recognizes and analyzes calls and conversations in real-time, as a conversation between the user 102 and the agent 152 and/or the agent computing device 155 happens during a call. The RTSA engine 135 monitors calls and activity in real-time, to detect predetermined words and phrases of interest as well as sentiment. This allows interactions between the user 102 and the agent 152 to be guided, resulting in better outcomes based on real-time analysis of call content and desktop activity. Automated interventions are provided, e.g., to agents via on-screen automated assistance, to managers via notifications and work-queue entries, and to analysts via reporting and post-call analytics.

In some implementations, the RTSA engine 135 uses a real-time recorder that listens to interactions as they happen, and based on conversational indicators, identifies opportunities that can be used to guide or alter the interaction towards a better outcome for the mutual benefit of both the user 102 (i.e., the end customer) and the organization of the agent 152.

In some implementations, the RTSA engine 135 is powered by the same speech engine that is used in the SA engine 125.

The value of RTSA is significantly amplified and easier to operationalize when it is deployed and used in tandem with speech analytics and desktop analytics in addition to call recording. The combinations of these components working together add broader and richer context relevant to the interaction by incorporating non-linguistic attributes associated with the interaction such as employee desktop activities and events, CTI data, employee skills and other non-voice content related to the call. Speech analytics complements RTSA by identifying trends, root causes, and automatic categorization of calls that enable users to focus on specific issues and opportunities during the interaction. Desktop analytics adds employee desktop screen information and events to the linguistic attributes. These components together validate the right use cases that require action in real-time. As described further herein, speech and screen analytics (speech and desktop) are combined in some implementations. In this manner, conversation and desktop activity are blended.

Figure 2:
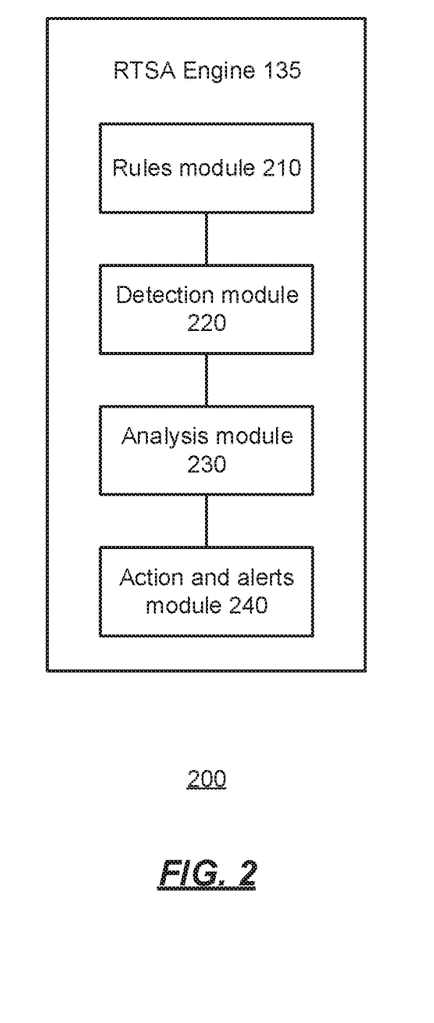
FIG. 2 is a diagram of an example real-time speech analytics engine.

FIG. 2 is a diagram 200 of an example real-time speech analytics engine, such as the real-time speech analytics engine 135 of FIG. 1. The RTSA engine 135 comprises a rules module 210, a detection module 220, an analysis module 230, and an action and alerts module 240.

The rules module 210 maintains, receives, determines, and/or sets the rules dictating which conversations will be analyzed and how those conversations will be analyzed. In some implementations, rules are defined around keywords, sentiment, and other attributes. Additionally or alternatively, the rules support the operators such as OR, AND, NEAR, and NOT and can also define conditions to identify situations where a keyword or phrase is not said.

The detection module 220 listens to the conversations according to the rules set by the rules module 210, and detects when one of the rules is triggered, e.g., by one or more words or phrases and/or other interaction(s). Thus, the detection module 220 listens to the presence or absence of words and phrases, and sentiment expressed. Based on the rules, as the detection module 220 finds matches of spoken words and phrases of interest in the conversations, the matches are provided to, and analyzed by, the analysis module 230.

The analysis module 230 analyzes the matches and/or event that is detected by the detection module 220. Based on the analysis, the analysis module 230 determines one or more actions and/or alerts that are to be performed, and provides instructions to the action and alerts module 240.

The action and alerts module 240 receives the instructions from the analysis module 230 and then implements the instructions accordingly, e.g., by performing one or more predetermined actions and/or alerts, such as sending notifications to employees or supervisors in real-time, within a few seconds. Example scenarios are described herein.

A first example is directed to a life event discussion scenario. The RTSA engine 135 'listens' for discussion of a life event discussion around a new place to live. The detection module 220 may have received rules from the rules module 210 to listen for terms such as "new house", "new condo", "new apartment", "moving", "bought" NEAR "house", "address" NEAR "change", etc., for example. When the detection module 220 'hears' this discussion in the speech of the user 102 (or the speech of the agent 152), the detection module 220 sends a notification to the analysis module 230. The analysis module 230 analyzes the detected term(s) brought to its attention by the detection module 220, and triggers the action and alerts module to take action, such as triggering an address change knowledge article to be presented to the agent 152 on the agent computing device 155.

Similarly, the user 102 may be discussing a medical condition. When the user 102 starts speaking about the medical condition, the detection module 220 of the RTSA engine 135 detects words defined for that medical condition, and the RTSA engine 135 provides the agent 152 with a link to a relevant article in a knowledge base, for example.

A second example is directed to a credit check disclosure scenario. The RTSA engine 135 'listens' for discussion of terms pertaining to a credit check (e.g., "credit" NEAR "check"). When the RTSA engine 135 'hears' the terms, the RTSA engine 135 recognizes that a discussion is occurring pertaining to a credit check, and notes that such a discussion is occurring (e.g., provides an indicator to the DPA engine 130 that the discussion is occurring). The DPA engine 130 receives the indicator and determines whether a credit check was discussed by the agent 152 and the user 102 (e.g., by the DPA engine checking stored indicators). If the credit check was not discussed, then a reminder is sent by the DPA engine 130 to the agent 152 via the agent computing device 155. Alternately, as soon as the RTSA engine 135 hears the terms, the RTSA engine 135 sends a credit check discussion reminder to the agent 152 via the agent computing device. 155.

A third example is directed to a risky or potentially fraudulent transaction scenario. RTSA engine 135 'listens' for language indicating a potentially fraudulent transaction, such as "empty my account", "external account", "soon as possible", "empty" NEAR "account", "transfer" NEAR "money", "cash out", "send" NEAR "check", etc. If the RTSA engine 135 'hears' this language, then the agent 152 is notified immediately via the agent computing device 155. The agent 152 may execute a different process depending on whether or not the user 102 is authenticated when they try to execute the transaction.

A fourth example is directed to a follow-up queue for missed first call resolution (FCR) scenario. When a call between the user 102 and the agent 152 ends, the RTSA engine 135 'looks back' over at least a portion of the call (e.g., the last 10 seconds of the call) to see if the term "call back" was mentioned (or other terms such as "call" NEAR "back", "calling back", etc., for example). If the term "call back" was mentioned, then the RTSA engine 135 places the call in a follow-up queue (e.g., the call is marked for follow-up) and notifies the agent 152 via the agent computing device 155 (e.g., a follow-up message is presented to the agent 152).

A fifth example is directed to a customer churn and save offer scenario. The RTSA engine 135 'hears' conversation indicating churn (terms such as "fed-up", "frustrated", "cancel my account", "close my account" "cancel" NEAR "account", "close out", "close" NEAR "account", etc., for example). When this occurs, the RTSA engine 135 alerts the DPA engine 130. The DPA engine 135 checks the user account status or other account and/or user information pertaining to the user 102 (e.g., the customer relationship management (CRM) software) prompts the agent 152, via the agent computing device 155, to make an appropriate save offer. The RTSA engine 135 'listens' for the offer to be presented and prompts a reminder to the agent 152 if, and only if, the offer is not presented (the RTSA engine 'listens' for terms such as "discount", "rebate", "offer", "credit", etc.). The churn scenario instructs the agent 152 to present a save offer. If the agent 152 does not present the offer, then the reminder is presented to the agent.

For example, telecom companies operate in an inherently high churn market. The ability to retain the subscriber base is important to help maintain growth and lower the high cost of acquiring new customers. In order to minimize churn, the RTSA engine 135 monitors calls and the terms that are being mentioned on the call in real-time. Once the RTSA engine 135 detects a churn risk, for example, when a user says "I would like to switch to another carrier", the RTSA engine 135 guides the agent 152 in real-time with a script and offers to attempt to stop the user from leaving.

Figure 3:
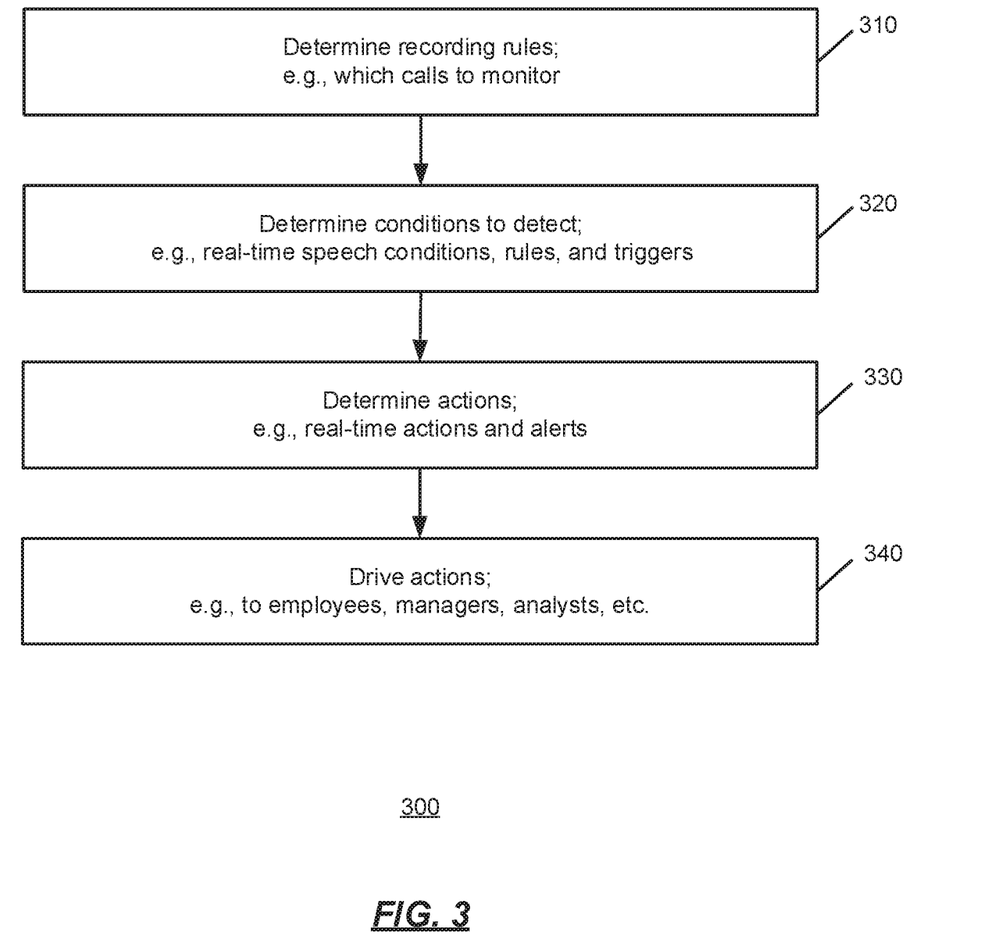
FIG. 3 is an operational flow of an implementation of a method for real-time speech analytics.

FIG. 3 is an operational flow of an implementation of a method 300 for real-time speech analytics. The method 300 may be performed by the RTSA engine 135, for example.

At 310, the recording rules are received and/or determined by the rules module 210. The recording rules may be provided to the rules module 210 by an administrator or other user, and/or may be determined by machine learning and/or artificial intelligence associated with the RTSA engine 135. The recording rules may be maintained, e.g., in storage of the RTSA engine 135. The rules may include which calls to record and/or monitor (e.g., between a user 102 and an agent 152).

At 320, conditions to detect are maintained, received, and/or determined by the detection module 220. The conditions may include real-time speech conditions (e.g., one or more terms detected in speech from the user 102 and/or the agent 152), rules (e.g., desktop (agent computing device 155) rules), and triggers (e.g., desktop (agent computing device 155) triggers). The conditions may be provided to the detection module 220 by an administrator or other user, and/or may be determined by machine learning and/or artificial intelligence associated with the RTSA engine 135.

At 330, actions to take are maintained, received and/or determined by the analysis module 230. The actions may include real-time actions and alerts, such as triggering a reminder or message to the agent 152 (e.g., via the agent computing device 155). The actions may comprise a notification, an indication, or an instruction, for example, responsive to the conditions detected by the detection module 220. The notification, indication, or instruction will be used to send an action or alert, e.g., to the agent 152 or other entity. The actions may be provided to the analysis module 230 by an administrator or other user, and/or may be determined by machine learning and/or artificial intelligence associated with the RTSA engine 135.

At 340, the action drivers are received and/or determined by the action and alerts module 240. The action drivers may include sending actions to, or performing actions on behalf of, agents, employees, managers, analysts, etc., responsive to receiving a notification, indication, or instruction from the analysis module 230. The actions may be provided to the actions and alerts module 240 by an administrator or other user, and/or may be determined by machine learning and/or artificial intelligence associated with the RTSA engine 135.

Figure 4:
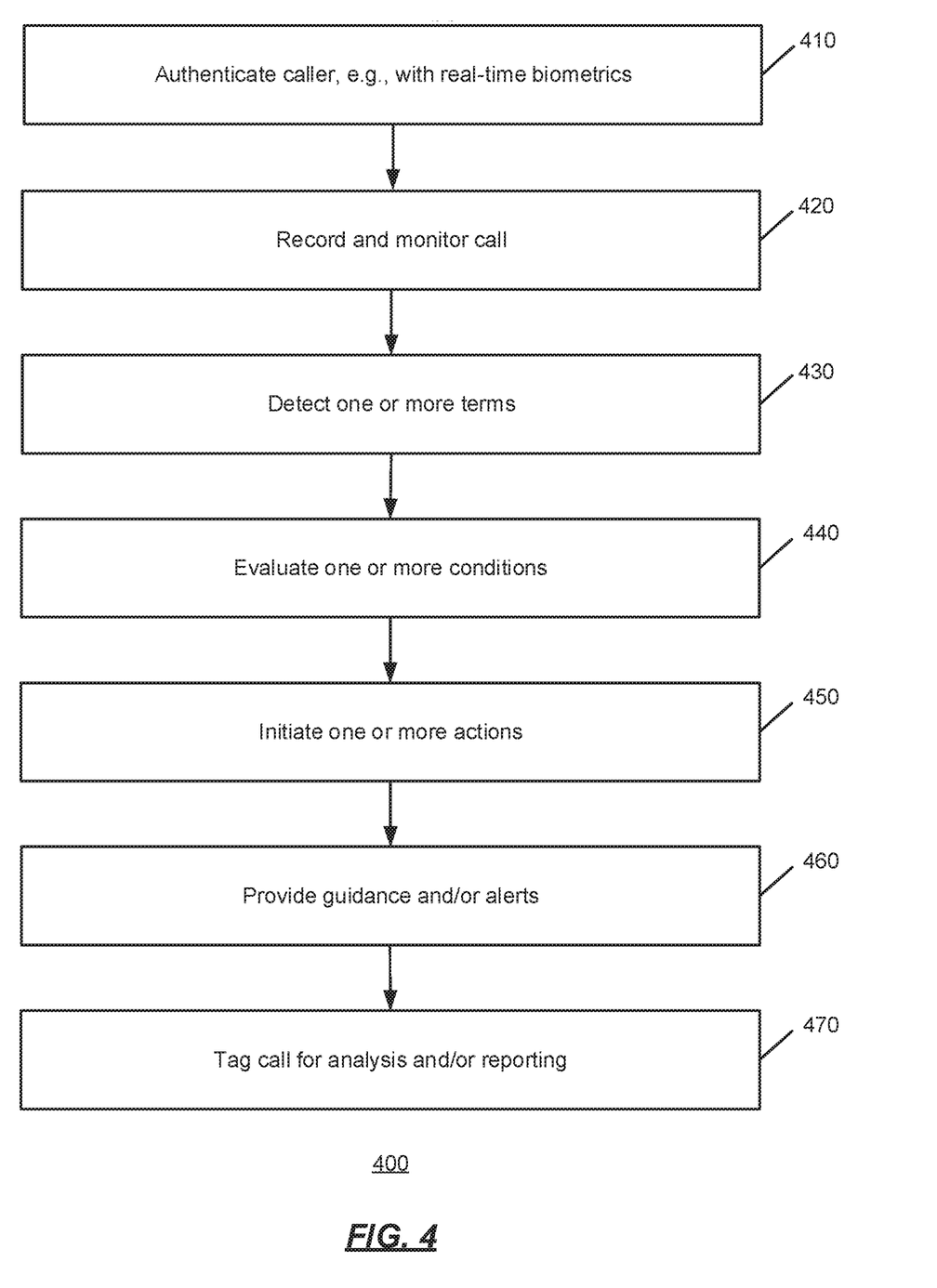
FIG. 4 is an operational flow of another implementation of a method for real-time speech analytics.

FIG. 4 is an operational flow of another implementation of a method 400 for real-time speech analytics. The method 400 may be performed by the RTSA engine 135, for example, either alone or in conjunction with other elements of the computing device 110, for example, depending on the implementation.

At 410, a caller (e.g., the user 102) places a call (e.g., to the agent computing device 155) and is authenticated, e.g., using real-time biometrics. Any type of real-time biometrics may be implemented, such as by the real-time biometrics engine 120.

At 420, the call is recorded (e.g., by the call recording engine 115) and monitored (e.g., by the RTSA engine 135).

At 430, one or more terms are detected, e.g., by the detection module 220. One or more conditions are evaluated at 440, e.g., by the analysis module 230. Responsive to the terms and/or conditions, at 450, one or more actions are initiated, e.g., by the action and alerts module 240.

At 460, guidance and/or alerts are provided, based on the initiated actions, e.g., to the agent 152 (e.g., via the agent computing device 155). Alternately or additionally, depending on the implementation, at 470, the call is tagged for analysis and/or reporting.

Real-time speech analytics solutions can help organizations: (1) ensure regulatory compliance and compliance with regulations and policies; (2) increase customer retention; (3) increase first contact resolution; (4) increase sales and manage marketing campaigns; and (5) enhance coaching opportunities.

The value can be further enhanced by the optional addition of performance management (PM) and knowledge management (KM) products. PM scorecards can add employee skills and key performance indicator (KPI) information that can be used by the RTSA engine 135 (e.g., the analysis module 230 and/or the action and alerts module 240) to only deliver guidance to employees who need them. KM can be used to deliver highly pertinent and knowledge to the employee and help accelerate the interaction to a desirable closure.

The broader context and framework of products increases the accuracy, and therefore, the action ability of the guidance. It helps deliver the best possible outcome for every interaction, both for the end consumer and the organization by recommending next best actions to employees and supervisors via interaction context-based alerts and screen pop-up messages that guide interactions to a mutually beneficial close.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a real-time speech analytics (RTSA) system is provided. The RTSA system comprises a rules module configured to maintain a plurality of rules pertaining to a call; a detection module configured to listen to the call according to the plurality of rules and to detect that one of the plurality of rules is triggered as a match or as an event; an analysis module configured to analyze the match or the event and determine at least one of an action or an alert to perform; and an action and alerts module configured to receive an instruction from the analysis module pertaining to the at least one of the action or the alert to perform, and configured to perform the at least one of the action or the alert.

Implementations may include some or all of the following features. The call is between a user computing device and an agent computing device. The agent computing device has at least one of human voice capability or virtual agent voice capability. The rules module, the detection module, the analysis module, and the action and alerts module are comprised within a computing device. The plurality of rules dictate the call to be analyzed and how the call is analyzed. The plurality of rules define a plurality of keywords to detect and sentiment to detect. The rules module is further configured to at least one of receive, determine, or set the plurality of rules. The at least one of the action or the alert to perform comprises at least one of alerting an agent to a condition, alerting the agent computing device to the condition, sending an instruction to an output device, or sending an indicator to a desktop and process analytics (DPA) engine. The at least one of the action or the alert to perform comprises at least one of providing a knowledge base article or link, alerting a credit check disclosure, alerting a credit check disclosure, alerting a potentially fraudulent transaction, marking a call for follow-up, or alerting to customer churn.

In an implementation, a system is provided. The system includes an agent computing device configured to receive a call from a user computing device; and a computing device comprising a real-time speech analytics (RTSA) engine configured to monitor and analyze the call in real-time to detect at least one of predetermined words, predetermined phrases, and sentiment, and to guide an interaction during the call using one or more automated interventions.

Implementations may include some or all of the following features. The system may further comprise a call recording engine configured to capture the interaction between a user and an agent during the call; a real-time biometrics engine configured to authenticate the user; a speech analytics (SA) engine configured to analyze and categorize the call; and a desktop and process analytics (DPA) engine configured to incorporate desktop events at the agent computing device during the call. The system may further comprise an output device configured to output at least one of an action or an alert generated by the RTSA engine. The RTSA engine comprises a rules module configured to at least one of receive, determine, set, or maintain a plurality of rules pertaining to the call; a detection module configured to listen to the call according to the plurality of rules and to detect that one of the plurality of rules is triggered as a match or as an event; an analysis module configured to analyze the match or the event and determine at least one of an action or an alert to perform; and an action and alerts module configured to receive an instruction from the analysis module pertaining to the at least one of the action or the alert to perform, and configured to perform the at least one of the action or the alert. The at least one of an action or an alert to perform comprises at least one of alerting an agent to a condition, alerting the agent computing device to the condition, sending an instruction to an output device, sending an indicator to a desktop and process analytics (DPA) engine; providing a knowledge base article or link, alerting a credit check disclosure, alerting a credit check disclosure, alerting a potentially fraudulent transaction, marking a call for follow-up, or alerting to customer churn. The plurality of rules dictate the call to be analyzed and how the call is analyzed, and wherein the plurality of rules define a plurality of keywords to detect and sentiment to detect. The agent computing device has at least one of human voice capability or virtual agent voice capability.

In an implementation, a method is provided. The method comprises maintaining, at a detection module, a plurality of real-time speech conditions, rules, and triggers; maintaining, at an analysis module, a plurality of real-time actions and alerts to take; receiving a call at an agent computing device; detecting in the call one of the plurality of real-time speech conditions, rules, and triggers; and initiating one or more of the plurality of real-time actions and alerts based on the detected one of the plurality of real-time speech conditions, rules, and triggers.

Implementations may include some or all of the following features. The method further comprises maintaining a plurality of recording rules pertaining to a call at a rules module, and implementing the plurality of recording rules on the call. The plurality of real-time speech conditions, rules, and triggers comprises at least one of predetermined words, predetermined phrases, and sentiment, to detect during the call. The plurality of real-time actions and alerts comprises at least one of alerting an agent to a condition, alerting the agent computing device to the condition, sending an instruction to an output device, sending an indicator to a desktop and process analytics (DPA) engine; providing a knowledge base article or link, alerting a credit check disclosure, alerting a credit check disclosure, alerting a potentially fraudulent transaction, marking a call for follow-up, or alerting to customer churn.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A real-time speech analytics (RTSA) system, comprising:
    a rules module configured to maintain a plurality of rules pertaining to a voice call between a user computing device and an agent computing device, wherein the agent computing device has virtual agent voice capability, wherein the voice call communicates with the virtual agent voice capability of the agent computing device;
    a detection module configured to listen to the voice call according to the plurality of rules and to detect that one of the plurality of rules is triggered as a match or as an event;
    an analysis module configured to analyze the match or the event and determine at least one of an action or an alert to perform; and
    an action and alerts module configured to receive an instruction from the analysis module pertaining to the at least one of the action or the alert to perform, and configured to perform the at least one of the action or the alert, wherein the at least one of the action or the alert comprises at least one of alerting a human agent via the agent computing device to a condition, or sending an instruction to the human agent via the agent computing device.

2. The RTSA system of claim 1, wherein the rules module, the detection module, the analysis module, and the action and alerts module are comprised within a computing device.

3. The RTSA system of claim 1, wherein the plurality of rules dictate the call to be analyzed and how the call is analyzed.

4. The RTSA system of claim 1, wherein the plurality of rules define a plurality of keywords to detect and sentiment to detect.

5. The RTSA system of claim 1, wherein the rules module is further configured to at least one of receive, determine, or set the plurality of rules.

6. The RTSA system of claim 1, wherein the at least one of the action or the alert to perform further comprises at least one of sending an instruction to an output device, or sending an indicator to a desktop and process analytics (DPA) engine.

7. The RTSA system of claim 1, wherein the at least one of the action or the alert to perform further comprises at least one of providing a knowledge base article or link, alerting a credit check disclosure, alerting a potentially fraudulent transaction, marking a call for follow-up, or alerting to customer churn.

8. A system comprising:
an agent computing device configured to receive a voice call from a user computing device, wherein the agent computing device has virtual agent voice capability, wherein the voice call communicates with the virtual agent voice capability of the agent computing device; and
a computing device comprising:
a real-time speech analytics (RTSA) engine configured to monitor and analyze the voice call in real-time to detect at least one of predetermined words, predetermined phrases, and sentiment, and to guide an interaction during the voice call using one or more automated interventions, wherein the one or more automated interventions comprises performing at least one of an action or an alert, wherein the at least one of the action or the alert comprises at least one of alerting a human agent via the agent computing device to a condition, or sending an instruction to the human agent via the agent computing device.

9. The system of claim 8, further comprising:
a call recording engine configured to capture the interaction between a user and an agent during the call;
a real-time biometrics engine configured to authenticate the user;
a speech analytics (SA) engine configured to analyze and categorize the call; and
a desktop and process analytics (DPA) engine configured to incorporate desktop events at the agent computing device during the call.

10. The system of claim 8, further comprising an output device configured to output at least one of the action or the alert generated by the RTSA engine.

11. The system of claim 8, wherein the RTSA engine comprises:

a rules module configured to at least one of receive, determine, set, or maintain a plurality of rules pertaining to the call;
a detection module configured to listen to the call according to the plurality of rules and to detect that one of the plurality of rules is triggered as a match or as an event;
an analysis module configured to analyze the match or the event and determine at least one of an action or an alert to perform; and
an action and alerts module configured to receive an instruction from the analysis module pertaining to the at least one of the action or the alert to perform, and configured to perform the at least one of the action or the alert.

12. The system of claim 8, wherein the at least one of an action or an alert to perform further comprises at least one of sending an instruction to an output device, sending an indicator to a desktop and process analytics (DPA) engine, providing a knowledge base article or link, alerting a credit check disclosure, alerting a potentially fraudulent transaction, marking a call for follow-up, or alerting to customer churn.

13. The system of claim 11, wherein the plurality of rules dictate the call to be analyzed and how the call is analyzed, and wherein the plurality of rules define a plurality of keywords to detect and sentiment to detect.

14. A method comprising:
maintaining, at a detection module, a plurality of real-time speech conditions, rules, and triggers;
maintaining, at an analysis module, a plurality of real-time actions and alerts to take;
receiving a voice call at an agent computing device, wherein the agent computing device has virtual agent voice capability, wherein the voice call communicates with the virtual agent voice capability of the agent computing device;
detecting in the voice call one of the plurality of real-time speech conditions, rules, and triggers; and
initiating one or more of the plurality of real-time actions and alerts based on the detected one of the plurality of real-time speech conditions, rules, and triggers, wherein the one or more of the plurality of real-time actions and alerts comprises at least one of alerting a human agent via the agent computing device to a condition, or sending an instruction to the human agent via the agent computing device.

15. The method of claim 14, further comprising maintaining a plurality of recording rules pertaining to a call at a rules module, and implementing the plurality of recording rules on the call.

16. The method of claim 14, wherein the plurality of real-time speech conditions, rules, and triggers comprises at least one of predetermined words, predetermined phrases, and sentiment, to detect during the call.

17. The method of claim 14, wherein the plurality of real-time actions and alerts further comprises at least one of sending an instruction to an output device, sending an indicator to a desktop and process analytics (DPA) engine, providing a knowledge base article or link, alerting a credit check disclosure, alerting a potentially fraudulent transaction, marking a call for follow-up, or alerting to customer churn.

* * * * *